(12) United States Patent  (10) Patent No.: US 6,968,443 B2
Bisinella                        (45) Date of Patent:    Nov. 22, 2005

(54) MICROPROCESSOR

(76) Inventor: Richard Bisinella, P.O. Box 44, Lara, Victoria 3212 (AU)

( * ) Notice: Subject to any disclaimer, the term of this patent is extended or adjusted under 35 U.S.C. 154(b) by 653 days.

(21) Appl. No.: 09/775,836

(22) Filed: Feb. 2, 2001

(65) Prior Publication Data

US 2001/0014938 A1 Aug. 16, 2001

(51) Int. Cl.$^7$ ............................................. G06F 13/00
(52) U.S. Cl. ......................................................... 712/37
(58) Field of Search .............................. 712/11, 37, 38; 710/316, 317

(56) References Cited

U.S. PATENT DOCUMENTS

| 3,940,744 | A | * | 2/1976 | Mock et al. ................ 711/185 |
|---|---|---|---|---|
| 4,331,956 | A | * | 5/1982 | Lovelace et al. .......... 340/2.26 |
| 4,760,518 | A | * | 7/1988 | Potash et al. ............... 710/107 |
| 4,807,183 | A | * | 2/1989 | Kung et al. ................. 710/317 |
| 5,187,796 | A | * | 2/1993 | Wang et al. .................... 712/4 |
| 5,640,586 | A | * | 6/1997 | Pechanek et al. ........... 712/13 |
| 5,682,544 | A | * | 10/1997 | Pechanek et al. ........... 712/16 |
| 5,696,913 | A | * | 12/1997 | Gove et al. ................. 710/317 |
| 5,842,034 | A | * | 11/1998 | Bolstad et al. .............. 712/11 |
| 6,088,783 | A | * | 7/2000 | Morton ......................... 712/22 |
| 6,282,583 | B1 | * | 8/2001 | Pincus et al. ............... 709/400 |

* cited by examiner

Primary Examiner—Eric Coleman
(74) Attorney, Agent, or Firm—Milde & Hoffberg, LLP

(57) ABSTRACT

The invention relates to a microprocessor having a plurality of components which are selected from registers (14,16), arithmetic logic units (30,32), memory (36,38), input/output circuits and other similar components where the plurality of components are interconnected in a manner which allows connection between some of the components to be varied under program control.

8 Claims, 6 Drawing Sheets

MICROPROCESSOR

FIELD OF THE INVENTION

This invention relates to a microprocessor and relates particularly, though not exclusively, to a microprocessor which can have a programmable instruction set.

BACKGROUND OF THE INVENTION

Typical microprocessors have registers, arithmetic logic units, memory, input/output circuits and other similar components which are hard wired together. The techniques for fabrication of such microprocessors is well established and provides a cheap and powerful base for modern computers. In order to add three numbers together from memory and return the result to memory, the traditional method is as follows:
1. Memory→Reg A (Read from memory and output to register A)
2. Memory→Reg B (Read from memory and output to register B)
3. Reg A+Reg B→Reg C (Add registers A,B and output to register C)
4. Reg C→Reg A (Read register C and output to register A)
5. Memory→Reg B (Read from memory and output to register B)
6. Reg A+Reg B→Reg C (Add registers A,B and output to register C)
7. Reg C→Memory (Read register C and output to memory)

From the above it is clear that such a simple operation would take at least 7 clock cycles to be completed. In addition, the present microprocessor architectures are slow, because programmers are forced to use an instruction set provided by the microprocessor manufacturer. Thus the programmer must construct their own software to use these set of predefined instructions. This example is grossly simplified as basic microprocessors do not take one cycle to process an instruction. Typically there would be a clock cycle for each of fetching the instruction, loading an opcode into the instruction register and decoding the instruction and processing the opcode per se.

OBJECTS OF THE INVENTION

It is an object of the present invention to provide a microprocessor which is not limited to the instruction set provided by the manufacturer.

A further object of the invention is to provide a microprocessor with components that can be interconnected in a variable manner.

Yet another object of the invention is to provide a microprocessor that is more flexible in its operation than conventional microprocessors.

SUMMARY OF THE INVENTION

With these and other objects in view the present invention provides a microprocessor having a plurality of components which are selected from registers, arithmetic logic units, memory, input/output circuits and other similar components commonly found in microprocessors, whereby said plurality of components are interconnected in a manner which allows connection between some of the components to be varied under program control.

Preferably said plurality of components are interconnected on a grid whereby each of said plurality of components can be switched under program control to be connected to a predetermined selection of one or more of said plurality of components.

BRIEF DESCRIPTION OF THE DRAWINGS

In order that the invention may be more readily understood and put into practical effect, reference will now be made to the accompanying drawings, in which.

DETAILED DESCRIPTION OF THE INVENTION

Figure 1:
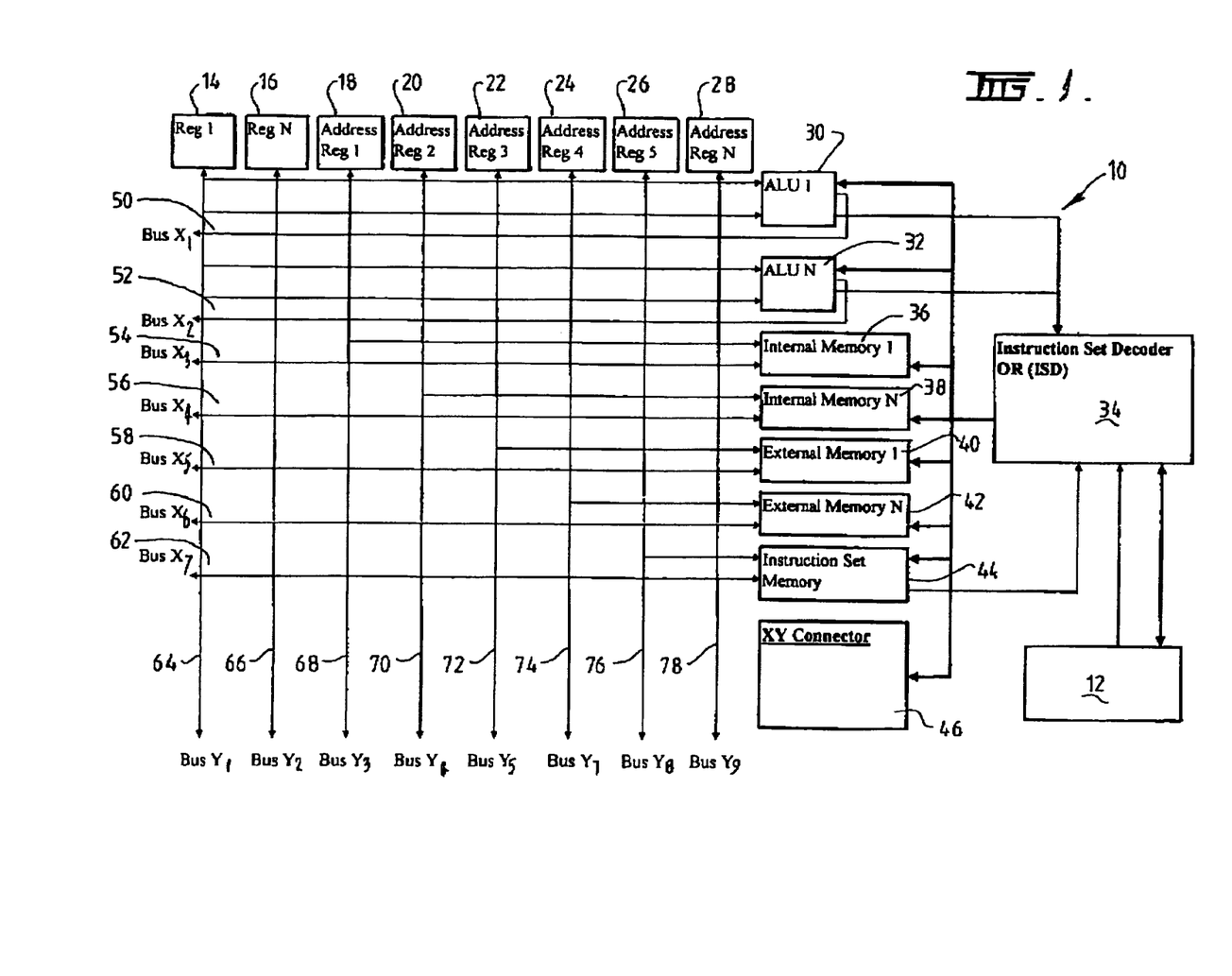
FIG. 1 is a block diagram of an embodiment of a microprocessor made in accordance with the invention.

In FIG. 1 of the drawings there is shown a microprocessor 10 which includes the following components:

An internal clock 12 to provide the timing signals for operation of the microprocessor. The internal clock 12 stores the time and date as well as the clock which times when a new instruction should be read. Internal clock 12 can be programmed to accommodate longer instructions by varying the length of the clock cycle.

Registers 14–16 are basically intermediate storage devices used to store temporary data. The microprocessor still relies on the registers to perform this task but allows the use of the register to be used more for storing important and common data rather than an intermediate storage device in between its final destination. The registers store an N-bit word as well as some of the basic flags. Flags are reminders of what occurred in the last arithmetic logic units (ALU) 30–32 output results. Such flags are:

Carry—if the last operation generated a carry from the most significant bit

Zero—if the result of the last operation was zero

Overflow—if the last operation produced a two's complement overflow

Sign—if the most significant bit of the result of the operation was 1.

Parity—if the number of one bits in the result of the last operation was even (even parity or odd (odd parity)

Half-carry—if the last operation generated a carry from the lower half-word

These flags are only stored for each associated register and the instruction set decoder 34 must decide if the flags will have an influence on the next calculation. Registers 14–16 will also be connected to the instruction set decoder 34 as will any flags associated with each register. Because more than one operation can occur at once we need to store the associated flags for each register. The flag attachment to each register is ideal for a solution to the problem, that more than one operation will occur at once but this is only a suggestion and there are many ways of implementing flags in the microprocessor architecture. (This is unlike some traditional architecture which only has one flag register)

ALUs 30–32 can perform the following functions:
1. Addition
2. Subtraction
3. Logical AND
4. Logical (Inclusive) OR
5. Logical Exclusive OR
6. Logical NOT (complement)
7. Increment (Add 1)
8. Decrement (subtract I)
9. Left shift (add input to itself)
10. Clear (Result is zero)
11. Multiply/Divide (May be a procedure or single command)
12. Compare functions such as greater than, less than and equal to
13. Shift Data Left, Shift Data Right
14. Any other common or required function can be added to enable microprocessor 10 to have access to these required functions.

The ALU 30–32 can change from a simple adder to a complex unit that can perform many arithmetic and logical functions. Therefore if the ALU cannot perform a function directly, several instructions will be necessary in order to produce the desired result.

Internal memory 36–38 can comprise cache, general purpose internal memory, stacks, internal sound card, and other internal functions like video, modem etc.

External memory 40–42 can comprise cache, general purpose memory, internal sound card, and other internal functions like video, modem etc. Except unlike internal memory 36–38 external memory is not on the microprocessor per se and the read and write speed is a lot slower than internal memory 36–38.

An internal instruction set 44 comprises a set of instructions which may be a single command or a set of commands to comprise a procedure. It could even be capable of calling other basic instructions in an instruction based procedure. There may be more than one internal instruction set types like RAM for temporary and EEPROM for critical instructions (or critical procedures).

The instruction set decoder 34 interprets the instruction set into timed control signals to the registers 14–28, ALUs 30–32, internal clock of microprocessor 12, memories 36–44 and XY or grid connector 46 and/or any other device to be controlled by the microprocessor.

Address registers 18–28 are basically registers that hold the current or next address for a particular portion of memory. In traditional microprocessors there is only one address register which limits you to read data sequentially. Whereas microprocessor 10 has a number of address registers one for each main segment (or memory chip) of memory. This allows the microprocessor to read the data from one address and write it to another address assuming that there are two distinct memory segments. Where a segment is a physically different memory, like memory chips or a hard-drive then every memory segment will have its own address register.

Figure 5:
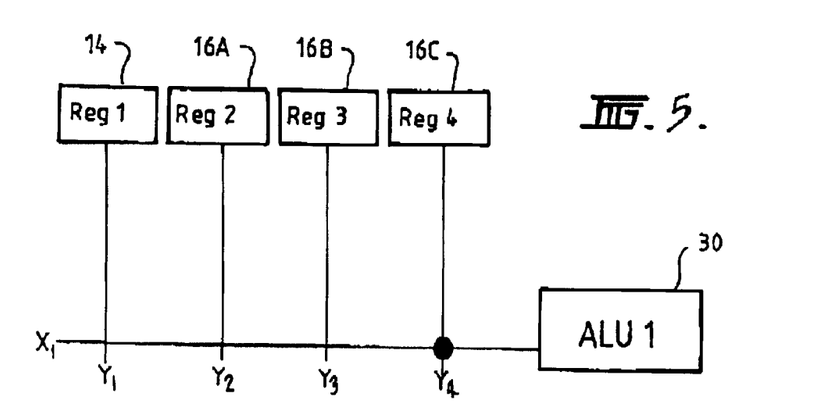
FIG. 5 is a view of the interconnections to link various components of the microprocessor shown in FIG. 1.
Figure 6:
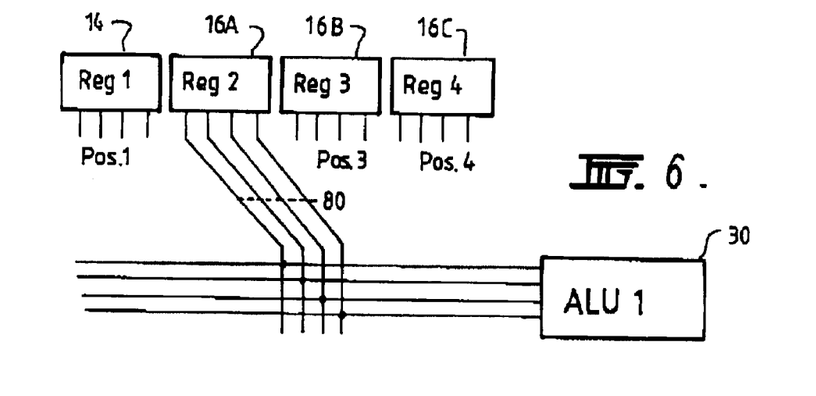
FIG. 6 is a similar view to that of FIG. 5 showing a first embodiment of providing the interconnections.
Figure 7:
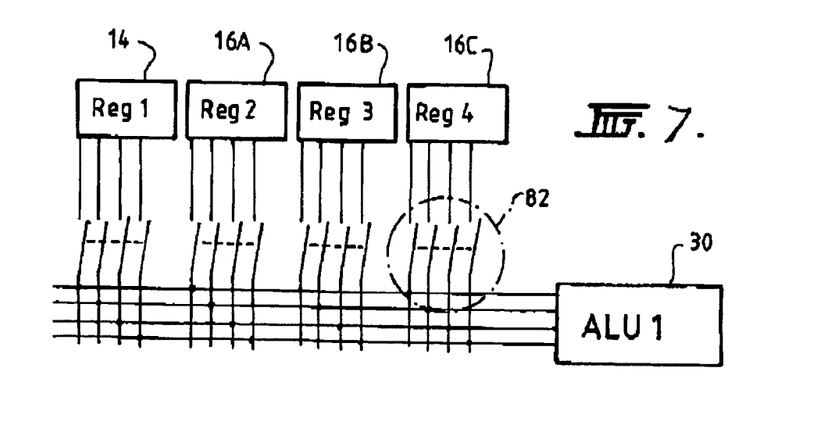
FIG. 7 is a similar view to that of FIG. 5 showing a second embodiment of providing the interconnections.

XY connector 46 controls an X-Y grid which is formed of X bus lines 50–62 and Y bus lines 64–78. Thus XY connector 46 will interconnect a component on the X bus e.g. ALU 30 to a component on the Y bus e.g. register 14. The interconnection can be made in various ways as shown in FIGS. 5 to 7. The basic interconnection is shown in FIG. 5 where each intersection or node of a Y bus line with an X bus line contains switches (not shown) which can be activated by a control register or similar under program control. To simplify the description only one bus line is shown with a more complete description of the bus discussed with reference to FIGS. 6 and 7. The number of control bits in the control register to select the appropriate switch positions can be calculated as follows:

$$N=X,Y$$

Where N is the number of bits in the control register; X is the number of X bus lines; and Y is the number of Y bus lines. Thus each bit will control one associated switch. If required, the number of bits can be reduced by compressing the data because not all possible combinations of switching will be required.

FIG. 6 shows a second embodiment where a bi-directional switch 80 with a single position. There is shown a bus of 4 wires for simplicity but the bus width can be any number i.e. B=1 to n, where B is the bus width and n is an integer. Using the 4 wire bus scheme there would need to be 4 bi-directional rotary switches per each X unit or for each Y unit. FIG. 6 shows ALU1 30 (a Y unit) connected to any X unit (Registers 14,16A,16B,16C) via the position of the rotary switch. The problem with this solution is that there is only one possible switch location which limits the microprocessor architecture. This solution will however provide a simpler design to implement. A further option for the limiting to the one position is to have two switches so that the possibility of two or more positions can be made available by adding another switch.

The third embodiment shown in FIG. 7 overcomes the problem by having a bi-directional switch 82 with multiple positions. This is particularly efficient and flexible method of implementation of switching. FIG. 7 shows all the bus connections. This example also uses a 4-wire bus, where when one node is closed then all 4 switches associated with that node also close. FIG. 7 shows how the X bus is connected to the Y bus via 4 bi-directional switches. Therefore for a B size bus we would therefore require B switches per node. For the example shown in FIG. 7 there are 4 nodes, which can connect the ALU 30 to Registers 14,16A,16B, 16C in any combination. All 4 nodes can be connected to Registers 14,16A,16B,16C, or some can be closed. Accordingly, there are 16 possible combinations in this example for what nodes can be closed and open.

Figure 2:
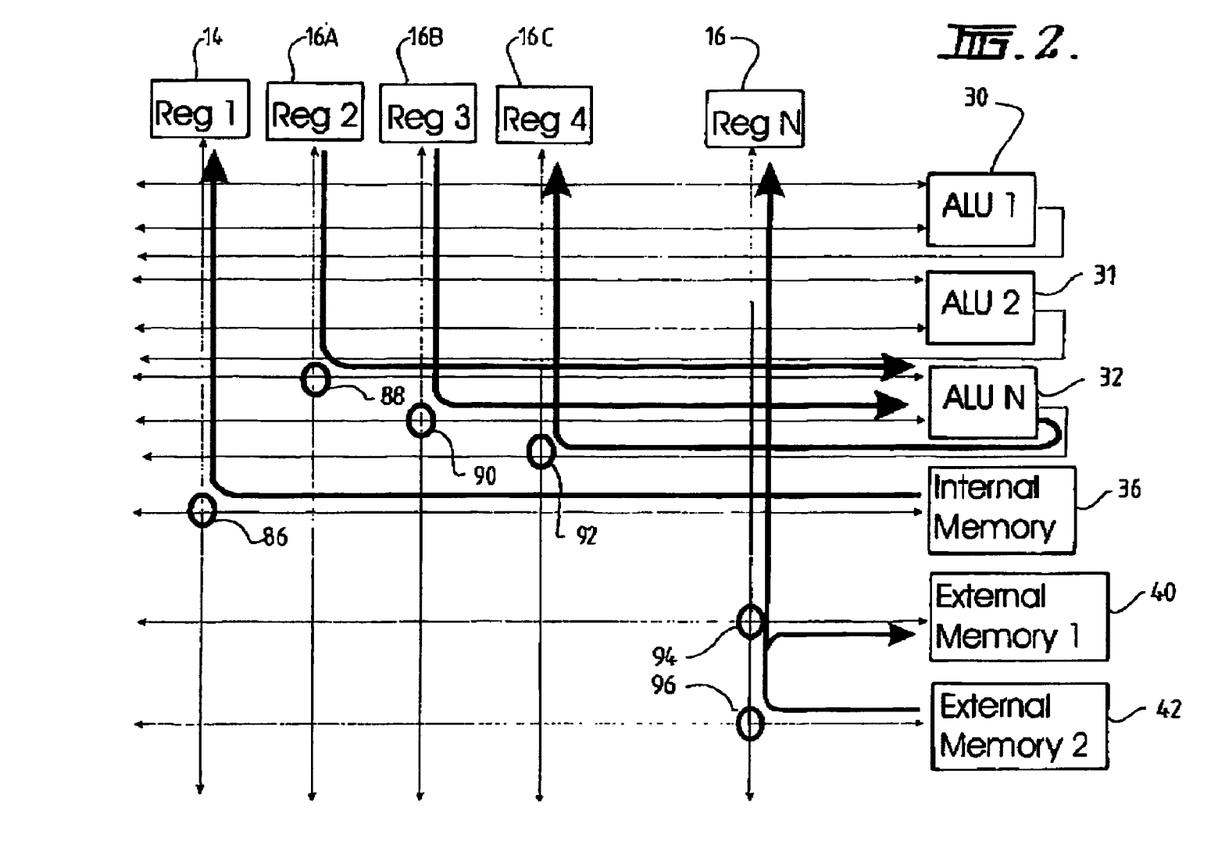
FIG. 2 is a similar view to that of FIG. 1 showing the interconnection of components.

The operation of microprocessor 10 is shown in FIG. 2. In this example the switch positions have been labelled as 86–96. The switch positions 86–96 have been set by XY connector 46 in its control register. This results in the following operations:
External memory 42→External Memory 40→Register 16 (switches 94,96)
Internal memory 36→Register 14 (switch 86)
Register 16A→ALU 32 (switch 88)
Register 16B→ALU 32 (switch 90)
Output of ALU 32→Register 16C (switch 92)

This set of connections shows the potential for microprocessor 10 to perform multiple operations in a single clock cycle. Obviously only one datum (word) can be output on to any data bus but multiple components can read the particular data bus. For example, where the external memory 42 is stored into external memory 40, it can also be stored into register 16 as seen above.

From the above it can be clearly seen that a bad programmer could easily cause a bus crash. Accordingly, there must be software and hardware error checking. Hardware error handling is performed by reading the instruction set before it is performed, or while it is in the process of being performed. This is achieved by reading the instruction set and performing a simple check to see that no two components are output onto the same data bus. When an error occurs the software is halted and a fatal error message is returned. This method of error handling is basically a back up if the software error handling does not work. For software error handling a preferred method is to put checks into the software so that before the software compiles its programs, it performs a check to see if the instruction set will perform a fatal error. Therefore the error can be fixed before it occurs by the software developer. Again this has limitations because it is very difficult to predict some outcomes of complex software.

In the description of the prior art an example was given which showed a traditional method of operation for adding three numbers together from memory. The example took at least 7 clock cycles. The same example will now be shown with reference to microprocessor 10.
1. Memory 36→Register 14
2. Memory 36→Register 16A
3. Register 14+Register 16A→Register 16B, Memory 36→Register 16C
4. Register 16B+Register 16C→Memory 36

Such a sequence of operations takes 4 clock cycles and results in a 175% increase in speed from the traditional method. Again with reference to the prior art example microprocessor 10 can perform a single operation in one clock cycle or it the instruction set memory could be programmed to perform a whole operation which could comprise a number of sub-commands. You could also write a program just in simple instructions a clock cycle at a time, rather than an instruction which takes around 4 clock cycles in the prior art. This would allow an instruction containing several clock cycles with no definite length.

If the numbers in steps 1 and 2 above are from different memories then two buses can be used to download both numbers to two registers in one cycle as shown in the following example:
1. Memory 36→Register 14, Memory 40→Register 16A
2. Register 14+Register 16A→Register 16B, Memory 36→Register 16C
3. Register 16B+Register 16C→Memory 36

This will provide a 233% increase in speed from the traditional method.

If the ALUs 30,31,32 can be timed and operate quick enough to be able to be operated in cascade, then a further increase in speed can be obtained as follows:
1. Memory 36→Register 14, Memory 40→Register 16A
2. Register 14+Register 16A→Register 16B, Reg 16B+Memory 40→Memory 36

This results in a 350% increase in speed over the traditional method.

Figure 4:
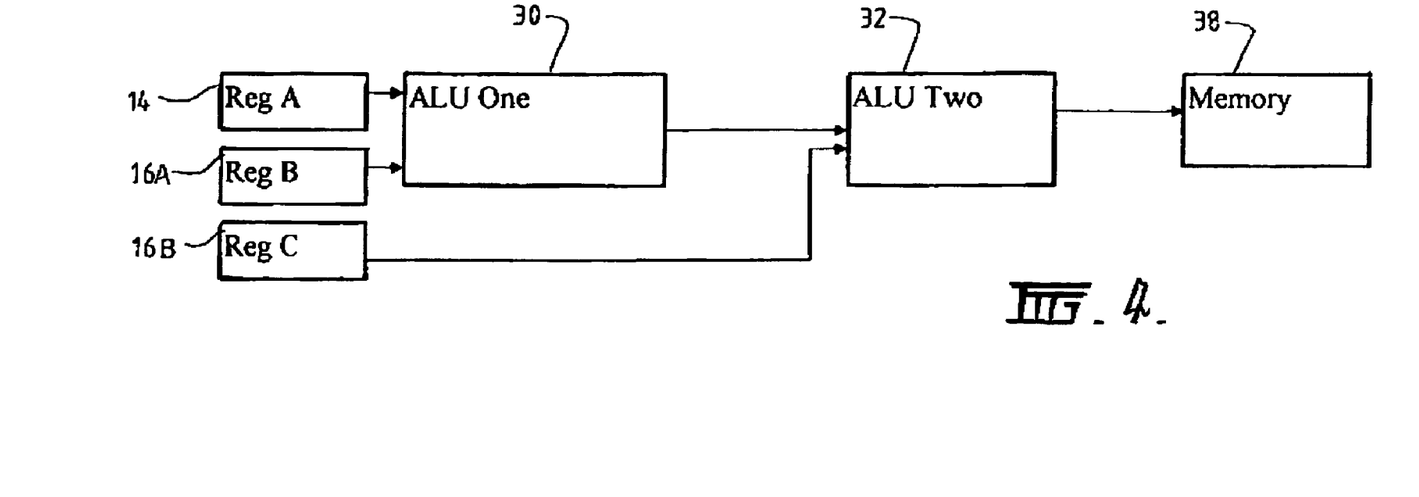
FIG. 4 is block diagram showing the microprocessor in one mode of operation.

FIG. 4 shows a further operation that is made possible with the invention. In this operation two ALUs 30,32 are used that allows the programmer to achieve a very quick calculation. As the output of ALU 32 must wait for the output of ALU 30, the total time of these two operations must be smaller than one clock cycle of microprocessor 10. Assuming a hypothetical 1 second clock cycle, and an ALU time of 0.4 seconds, then the total time to perform the two ALU operations would be 0.8 seconds. Such time would allow the result to be stored into memory, assuming that the data can be stored immediately. If the ALU takes 0.55 seconds to perform its operation then both ALU operations would take 1.1 seconds which is too slow for microprocessor 10 whose hypothetical clock runs at 1 second. Thus the total operation would take 2 seconds to complete as 2 clock cycles are required. To overcome this problem internal clock 12 could be slowed to a hypothetical 1.2 seconds. As the two ALU operations are completed within 1.1 seconds then the complete calculation is completed within 1.2 seconds (1 clock cycle) and thus there would be a saving of a hypothetical 0.8 seconds from the previous 2 seconds taken by the previous example. The internal clock 12 can be slowed by hardware or software solutions. In software, an instruction can be sent to internal clock 12 to slow down. In hardware, circuit elements can be used to sense the need to slow down the clock in order to perform the operation.

Figure 3:
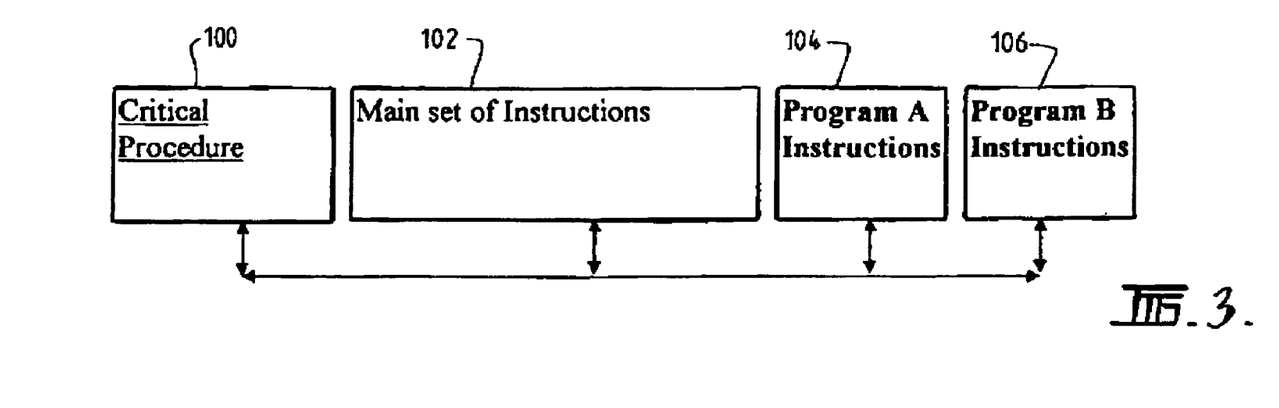
FIG. 3 is diagram to illustrate the loading procedures for a computer which includes the microprocessor of the present invention.

In FIG. 3 there is shown a diagram of the loading procedures for a computer (not shown) which includes microprocessor 10 of the invention. The loading procedures are as follows:

Critical procedure 100: When a computer starts up it must initiate a few basic or "bootstrap" operations so that it knows where to start loading the operating system for example. Therefore this critical procedure 100 is loaded when the computer is turned on and loads the main set of instructions 102 together with the operating system. These critical instructions would be few in number and very simple so that they would not need to be changed in the future.

Main set of instructions 102: The main set of instructions 102 are the basic set of instructions which are critical in the start-up procedure. They would normally be written by the operating system programmer to be used for the operating system essential instructions. The operating system instructions would be required to operate the operating system, for example a windows based operating system.

Program instructions 104,106: Each program, if it requires, can have its own set of instructions, and therefore can be as many sets of program instructions as long as there is sufficient memory.

FIG. 3 shows the critical procedures 100 which would be used to start up the computer and load the operating system 102 which would load its own set of instructions. Programs 104,106 would have their own set of instructions, if required. All the different programs can use each others' instructions, if required.

Software compilers could be developed so as to create an optimal set of instructions for a particular program so that it minimises memory space required and maximises speed and performance. Therefore a modest programmer could continue to write programs in languages such as C++, Visual Basic and many other languages. The programmer would not need to worry about developing the instruction set because the compiler develops the optimal set. The flexibility of microprocessor 10 enables a software developer to have full control over the computer while not increasing the computer in complexity. Microprocessor 10 can have different programs working on a different set of instruction sets while also being able to implement a basic set of instructions. Microprocessor 10 is also capable of deleting and adding new instructions as they are needed.

The use of microprocessor 10 in a computer system allows a software developer to have full control of what he or she wants the computer to perform. The software developer can write his or her own instruction set and then to use that instruction set in their software. This enables the software developer full control over the microprocessor and the computer. Microprocessor 10 can also simulate other microprocessors and the hardware level rather than at software level which is difficult and ineffective. If a programmer encountered a fundamental problem eg the Y2K problem he or she could simply re-write the instruction set to calculate dates and store dates in an improved way.

Figure 8:
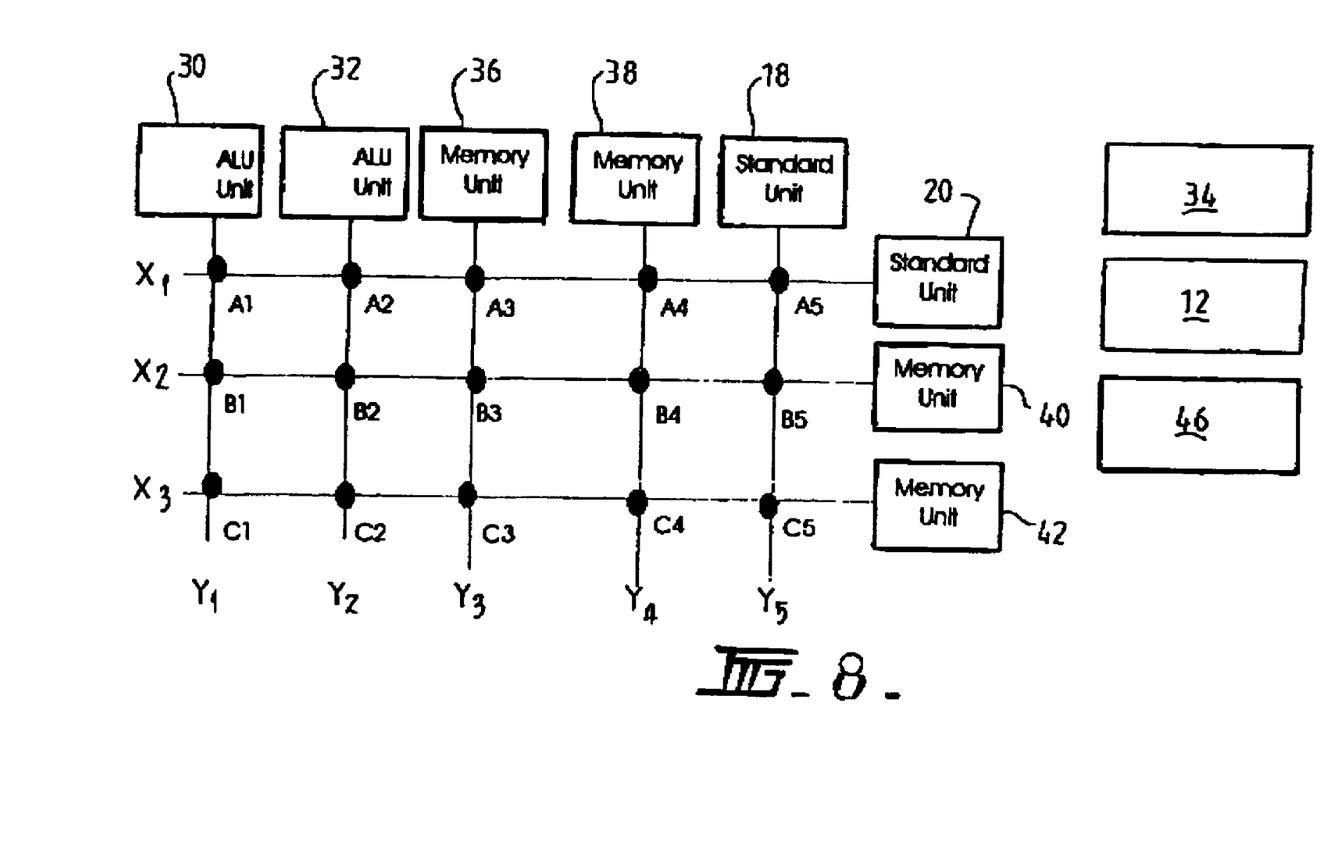
FIG. 8 is a similar view to that of FIG. 1 showing a variation of positioning of components.
Figure 9:
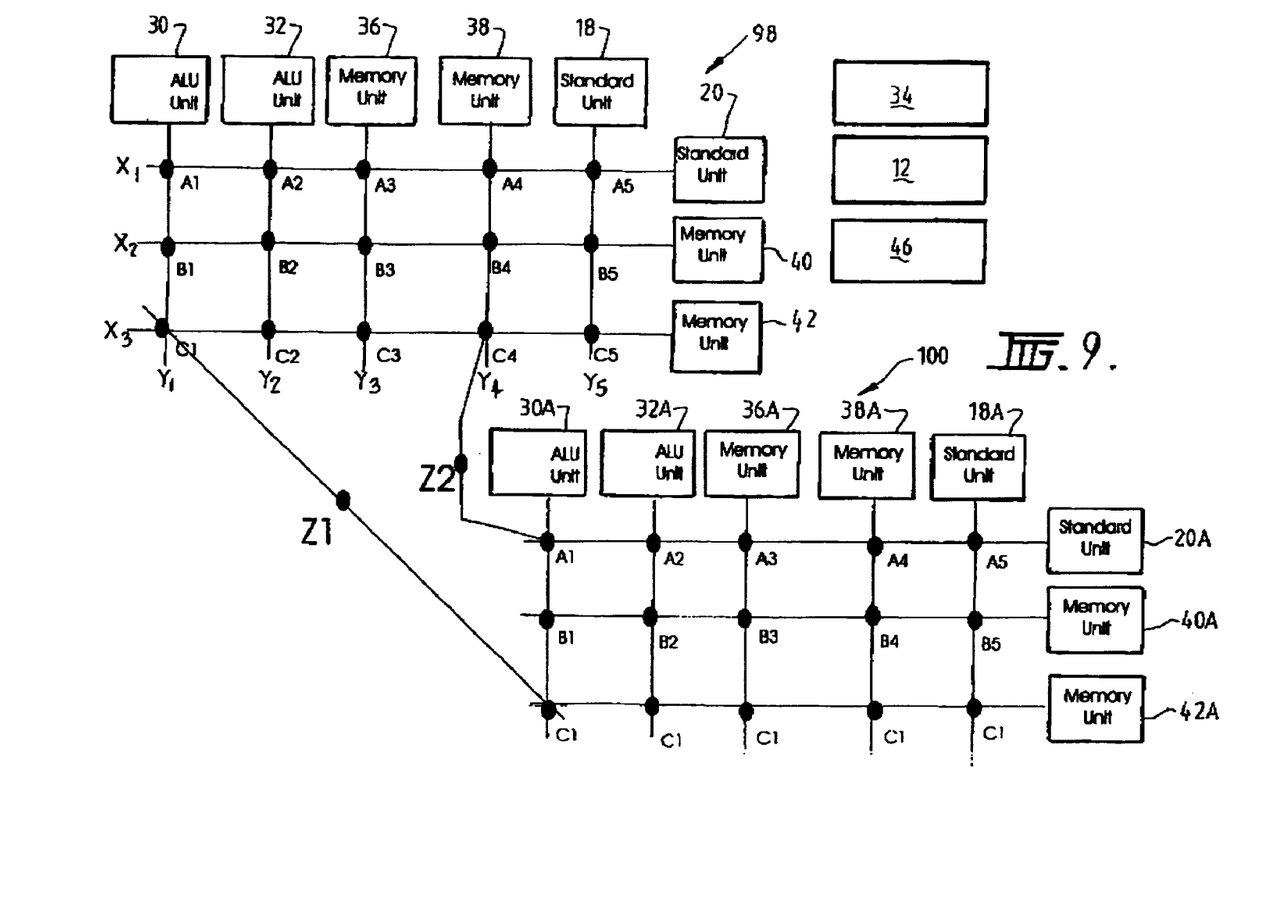
FIG. 9 is a similar view to that of FIG. 8 showing a multi-grid architecture.

In the embodiments shown in FIGS. 8 and 9 the same numerals have been used, where applicable, to indicate similar integers to those used in FIGS. 1 to 7 to avoid repetition of description.

In FIG. 8 there is shown a similar arrangement to that shown in FIG. 1 but the positions of some components have been changed. Such changes allow for the flexibility of the invention. The switch nodes A1,A2,B1,B2 etc each have N switches, where N is the bus size, eg for a 8 parallel bus N=8. FIG. 8 illustrates a single grid where data can only travel in the X or Y directions but this can be extended to multiple grids as shown in FIG. 9.

FIG. 9 includes a first grid 98 which corresponds to FIG. 8. A second grid 100 is linked to first grid 98 by nodes Z1 and Z2. The exact number and linking of the Z nodes can vary to suit requirements. In the embodiment shown, node Z1 links node C1 of first grid 98 to node C1 of second grid 100 and node Z2 links node C4 of first grid 98 to node A1 of second grid 100. As each connection is made in the architecture the number of switching units (or nodes) required will increase and also the complexity of programming will also increase. The advantage of this method is that you can have two processors operating independently of each other but can also communicate with each other. It is not necessary to have every node in grid 98 connecting to a corresponding node in grid 100. There is also no limit to the number of grids 98,100 that can be connected. Although grids 98,100 are identical in the embodiment shown this is not necessary and variations can occur to suit requirements. There may be one instruction set decoder 34 as shown to control both grids 98,100 or there could be a dedicated one instruction set decoder for each grid 98,100. Each grid 98,100 would require communication to each other via a separate data bus or via control signals. For example this would enable one grid to communicate to the next grid and request information or a function.

Although the preferred embodiments have shown limited components the invention can have any number of registers, ALUs, internal memory and external memory of any size. Any component (ALU, register internal or external memory) can be connected together in many combinations and more than one connection can take place in one clock cycle. In the preferred embodiment the registers 14–28 are shown on the Y bus but they can be on the X bus or in any combinations on either bus. The buses can either be serial or parallel. Parallel bus will be quicker but to create a serial bus ie B=1 would be much easier as only one switch would be required per node unlike N switches for an N-bit bus.

The invention will be understood to embrace many further modifications as will be readily apparent to persons skilled in the art and which will be deemed to reside within the broad scope and ambit of the invention, there having been set forth herein only the broad nature of the invention and certain specific embodiments by way of example.

I claim:

1. In a microprocessor having a clock, a program control and a plurality of circuit components comprising registers, at least one arithmetic logic, unit (ALU) having inputs and at least one output, a memory and input/output circuits, the improvement wherein said plurality of components are interconnected on a grid of buses; wherein each of said plurality of components can be switched under program control to be connected to a predetermined selection of one or more of said plurality of components to route data through said grid for processing by said predetermined selection of one or more of said plurality of components; wherein said inputs and said at least one output of said ALU are each connected to a separate bus of said grid; and wherein said ALU is operative to receive, process and output data during one microprocessor clock cycle.

2. The microprocessor as claimed in claim 1, further comprising a grid connector which includes logic for interconnecting a predetermined one or more of said plurality of components with one or more other components of said plurality of components to said grid.

3. The microprocessor as claimed in claim 1, further comprising an instruction set decoder for interpreting the instruction set of said microprocessor into timed signals to said components, a clock for timing operations of said microprocessor and a grid connector which provides logic for interconnecting a predetermined one or more of said plurality of components with one or more other components of said plurality of components to said grid.

4. The microprocessor as claimed in claim 1, further comprising at least one further grid of a plurality of further components which are selected from registers, arithmetic logic units, memory, input/output circuits, and wherein at least a part of said grid is coupled to at least a part of said at least one further grid.

5. The microprocessor as claimed in claim 1, wherein said grid is an X-Y grid having respective X and Y buses and each component connects to one or more of said buses, a switch node is present on each intersecting point of an X and Y bus whereby each switch node provides direct bi-directional connection between said X and Y buses to provide connection of a first one of said components to a second one of said components.

6. The microprocessor as claimed in claim 5, wherein connection of said first one of said components to said second one of said components can occur through one or more of said switch nodes to provide X-X, X-Y, Y-Y, or Y-X bus connections.

7. The microprocessor as claimed in claim 5, wherein a plurality of connections are provided whereby each component can make multiple connections through said grid to one or more of the other components.

8. The microprocessor as claimed in claim 6, wherein a plurality of X-X, X-Y, Y-Y and Y-X bus connections can be made.

* * * * *

UNITED STATES PATENT AND TRADEMARK OFFICE
CERTIFICATE OF CORRECTION

PATENT NO. : 6,968,443 B2
APPLICATION NO. : 09/775836
DATED : November 22, 2005
INVENTOR(S) : Richard Bisinella It is certified that error appears in the above-identified patent and that said Letters Patent is hereby corrected as shown below:

On the Title Page, add the following:

(30)    Foreign Application Priority Data

Feb. 4, 2000    (AU)........................PQ 5429

Signed and Sealed this

Twenty-fourth Day of April, 2007

JON W. DUDAS
*Director of the United States Patent and Trademark Office*